United States Patent Office 2,855,422
Patented Oct. 7, 1958

2,855,422

O-(3,4-DICHLOROPHENYL) O-METHYL PHOSPHOROAMIDOTHIOATES

Kenneth C. Kauer and Edgar C. Britton, Midland, Mich., assignors to The Dow Chemical Company, Midland, Mich., a corporation of Delaware No Drawing. Application March 5, 1956
Serial No. 569,281

5 Claims. (Cl. 260—461)

This invention is concerned with the O-(3,4-dichlorophenyl) O-methyl phosphoroamidothioates having the formula

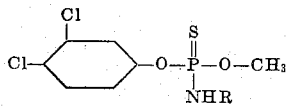

in which R represents hydrogen, methyl, ethyl or isopropyl. These new compounds are oily liquids, somewhat soluble in many organic solvents and of very low solubility in water. They have been found to be active as parasiticides and are adapted to be employed as active toxic constituents of compositions for the control of mites and insect organisms such as flies and roaches.

The new compounds may be prepared by reacting ammonia, methylamine, ethylamine or isopropylamine with O-(3,4-dichlorophenyl) O-methyl phosphorochloridothiolate of the formula

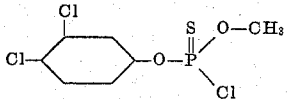

The reaction is somewhat exothermic and takes place smoothly at the temperature range of from −10 to 30° C. with the formation of the desired product and ammonium hydrochloride or amine hydrochloride of reaction. The temperature may be controlled by regulating the rate of contacting the reactants and by external cooling. The reaction is carried out in the presence of an inert solvent such as acetone, methyl ethyl ketone or benzene. In a preferred operation, the reaction is carried out with aqueous ammonia or aqueous amine and in a water miscible solvent. Good results are obtained when employing at least two molecular proportions of ammonia or amine with each molecular proportion of the phosphorochloridothioate reagent.

In carrying out the reaction, gaseous ammonia or gaseous or liquid amine is added portionwise to the phosphorochloridothioate reagent dissolved in the solvent. In an alternative procedure, an aqueous solution of ammonia or amine is mixed and blended with the phosphorochloridothioate reagent dissolved in the solvent. The contacting of the reagents is carried out with stirring and at a temperature of from −10° to 30° C. Upon completion of the reaction, the reaction mixture is washed with water and water immiscible solvent removed by evaporation to obtain the desired product as a residue.

The following examples illustrate the invention but are not to be construed as limiting.

EXAMPLE 1

*O-(3,4-dichlorophenyl) O-methyl phosphoroamidothioate*

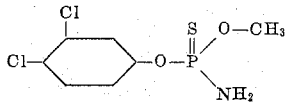

A 26 percent aqueous solution of ammonia (15 grams of solution) was added portionwise with stirring to 25 grams (0.1 mole) of O-(3,4-dichlorophenyl) O-methyl phosphorochloridothioate (having a refractive index n/D of 1.5692 at 25° C.) dissolved in 75 milliliters of acetone. The addition was carried out with stirring and at a temperature of about 5° C. Following the addition, the reaction mixture was diluted with methylene chloride and the resulting mixture washed with water and dried over sodium sulfate. The methylene chloride was then separated by fractional distillation under reduced pressure to obtain an O-(3,4-dichlorophenyl) O-methyl phosphoroamidothioate product as a residue. This product was an oily liquid having a density of 1.439 at 25° C. and a refractive index n/D of 1.5769 at 25° C.

EXAMPLE 2

*O-(3-4-dichlorophenyl) O-methyl N-methyl phosphoroamidothioate*

A 25 percent aqueous solution of monomethylamine (12.4 grams, 0.4 mole of methylamine) was added portionwise with stirring to 55 grams (0.2 mole) of O-(3,4-dichlorophenyl) O-methyl phosphorochloridothioate dissolved in 100 milliliters of acetone. The addition was carried out over a period of one hour and at a temperature of from 5° to 10° C. Stirring was thereafter continued for 0.5 hours to complete the reaction. The reaction mixture was then diluted with methylene chloride and the resulting mixture washed with water. Upon evaporation of the methylene chloride, there was obtained an O-(3,4-dichlorophenyl) O-methyl N-methyl phosphoroamidothioate product as a residue. This product was an oily liquid having a density of 1.3914 at 25° C. and a refractive index n/D of 1.5662 at 25° C.

EXAMPLE 3

*O-(3,4-dichlorophenyl) O-methyl N-ethyl phosphoroamidothioate*

Gaseous ethylamine was slowly bubbled over a period of one hour into 55 grams (0.2 mole) of O-(3,4-dichlorophenyl) O-methyl phosphorochloridothioate dissolved in 200 milliliters of acetone. The addition was carried out at a temperature of from 5° to 22° C. and required the employment of 20 grams (0.45 mole) of ethylamine. Upon completion of the addition, the reaction mixture was processed as described in Example 2 to obtain an O-(3,4-dichlorophenyl) O-methyl N-ethyl phosphoroamidothioate product as a liquid residue having a density of 1.3355 at 25° C. and a refractive index n/D of 1.5599 at 25° C.

EXAMPLE 4

*O-(3,4-dichlorophenyl) O-methyl N-isopropyl phosphoroamidothioate*

Isopropylamine (23.6 grams, 0.4 mole) was added portionwise with stirring to 55 grams (0.2 mole) of O-(3,4-dichlorophenyl) O-methyl phosphorochloridothioate dissolved in 100 milliliters of acetone. The addition was carried out over a period of one hour and at a temperature of from 4° to 15° C. The reaction mixture was then processed in the manner as described in Example 2 to obtain an O-(3,4-dichlorophenyl) O-methyl N-isopropyl phosphoroamidothioate product as a liquid residue having a density of 1.3096 at 25° C. and a refractive index n/D of 1.5508 at 25° C.

The new O-(3,4-dichlorophenyl) O-methyl phosphoroamidothioates are effective as parasiticides and adapted to be employed for the control of household and agricultural pests. For such use the products may be dispersed on a finely divided carrier and employed as dusts. The new products may also be employed in oils, as constituents in water emulsion or in water dispersions. In a representative operation 100 percent controls of house flies and bean aphids have been obtained with aqueous compositions containing 50 parts by weight of O-(3,4-dichlorophenyl) O-methyl phosphoroamidothioate per million parts by weight of aqueous composition.

The O-(3,4-dichlorophenyl) O-methyl phosphorochloridothioate employed as a starting material may be prepared by reacting one molecular proportion of O-(3,4-dichlorophenyl) phosphorodichloridothioate with one molecular proportion of sodium methylate in an inert organic solvent such as benzene. In carrying out the reaction, the reactive agents and solvent are mixed together and heated for a short period of time at a temperature of from 20°–80° C. The reaction mixture is then successively washed with dilute aqueous sodium hydroxide and water and the solvent separated by evaporation to obtain the desired starting material as a liquid residue.

We claim:

1. An O-(3,4-dichlorophenyl) O-methyl phosporoamidothioate of the formula

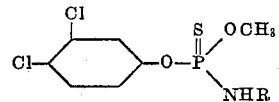

in which R represents a member of the group consisting of hydrogen, methyl, ethyl and isopropyl.

2. O-(3,4-dichlorophenyl) O-methyl phosphoroamidothioate.
3. O-(3,4-dichlorophenyl) O-methyl N-methyl phosphoroamidothioate.
4. O-(3,4-dichlorophenyl) O-methyl N-ethyl phosphoroamidothioate.
5. O-(3,4-dichlorophenyl) O-methyl N-isopropyl phosphoroamidothioate.

References Cited in the file of this patent
UNITED STATES PATENTS
2,552,574    Moyle et al. _____ May 15, 1951